July 23, 1963 R. H. ROSE 3,098,254
LUMINATED DIP STICK WIPER
Filed Nov. 1, 1958
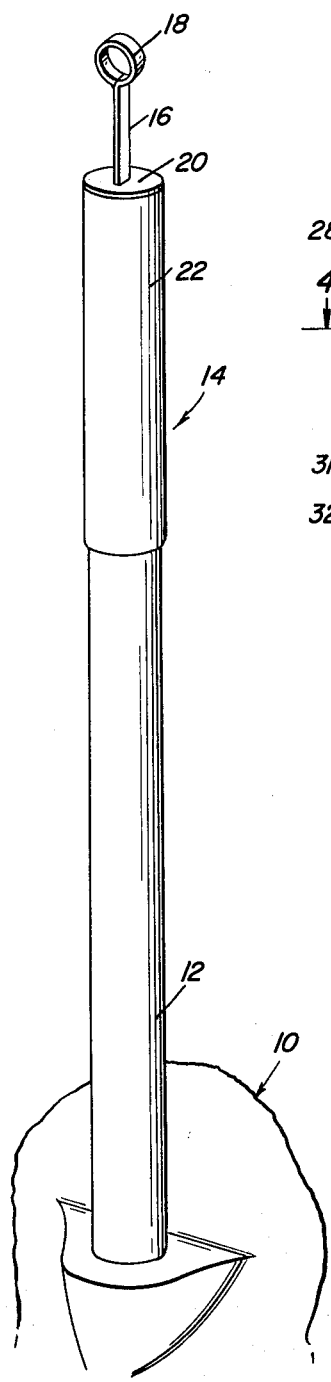
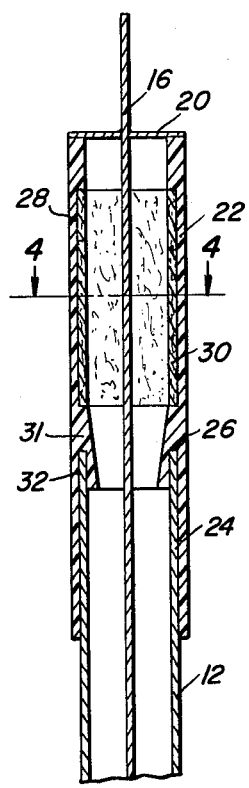
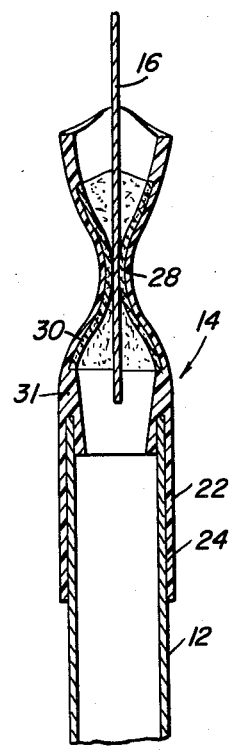
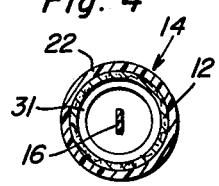
Robert H. Rose
INVENTOR.

United States Patent Office 3,098,254
Patented July 23, 1963

3,098,254
LUMINATED DIP STICK WIPER
Robert H. Rose, Vassar Road, Poughkeepsie, N.Y.
Filed Nov. 1, 1962, Ser. No. 234,658
8 Claims. (Cl. 15—210)

This invention relates to a novel and useful dip stick wiper and more specifically to a dip stick wiper primarily designed for securement to the upper end of an upstanding cylindrical oil filler tube of the type normally having a dip stick removably positioned therein and supported thereby.

Although it is easy to locate, remove and replace a dip stick of an internal combustion engine of a motor vehicle during daylight hours, during the night hours and even in locations such as service stations and garages which are artificially lighted, the hoods of most motor vehicles make it difficult to locate the dip stick since most of the direct light rays are blocked by the hood of a motor vehicle in an area which is artificially lighted.

The dip stick wiper of the instant invention comprises a cylindrical extension for the upper end of the upstanding oil filler tube of an internal combustion engine and is constructed in a manner whereby it may be snugly telescoped over the upper end of the oil filler tube. The dip stick wiper is constructed of flexible but semi-rigid material and has mounted therein means for wiping the dip stick as it is withdrawn from within the oil filler tube and the dip stick wiper. Inasmuch as the wiper is constructed of flexible material, the opposite sides thereof may be deflected inwardly in order to move the wiping means thereof into contact with opposite sides of the dip stick as the dip stick is removed from within the oil filler tube of the internal combustion engine.

The main object of this invention is to provide a dip stick wiper constructed in a manner whereby it may be readily semi-permanently secured to the upper end of an oil filler tube and utilized to wipe the dip stick of an internal combustion engine to which the oil filler tube is secured as the dip stick is withdrawn from the oil filler tube.

A further object of this invention, in accordance with the immediately preceding object, is to provide a dip stick wiper which is constructed of a material having phosphorescent properties whereby its location under the hood of a motor vehicle may be readily determined even in total darkness.

Yet another object of this invention, in accordance with the immediately preceding object, is to provide a dip stick wiper constructed in a manner whereby it may be utilized to guide the lower end of a dip stick into the upper end of the oil filler tube to which the dip stick wiper is secured.

A final object of this invention to be specifically enumerated herein is to provide a dip stick wiper in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a fragmentary perspective view of a conventional type of internal combustion engine shown with the dip stick wiper of the instant invention mounted up top the cylindrical oil filler tube of the internal combustion engine;

FIGURE 2 is an enlarged fragmentary vertical sectional view taken substantially upon a plane passing through the longitudinal center line of the oil filler tube;

FIGURE 3 is a fragmentary vertical sectional view similar to that of FIGURE 2 but showing the opposite sides of the dip stick wiper urged toward each other for the purpose of wiping the dip stick which is being withdrawn from within the cylindrical oil filler tube; and FIGURE 4 is a horizontal sectional view taken substantially upon the plane indicated by the section line 4—4 of FIGURE 2.

Referring now more specifically to the drawings the numeral 10 generally designates a conventional type of internal combustion engine which includes an upstanding cylindrical oil filler tube 12. The lower end of the oil filler tube 12 is secured within an opening in the internal combustion engine 10 and the dip stick wiper of the instant invention is generally designated by the reference numeral 14 and is secured to the upper end of the oil filler tube in a manner which will be hereinafter more fully set forth.

A dip stick 16 provided with a handle portion 18 on its upper end and an abutment washer 20 which is normally utilized to close the upper end of the oil filler tube 12 and to support the dip stick 16 from the oil filler tube as shown in FIGURES 1 and 2 of the drawings with the abutment washer 20 overlying the upper end of the cylindrical member 22 which forms the body of the dip stick wiper 14.

The cylindrical member 22 defines a bore 24 which extends longitudinally therethrough and it may be seen that the lower end of the bore 24 snugly receives the upper end of the oil filler tube 12. However, the cylindrical member 22 includes a radially inwardly projecting annular shoulder 26 against which the upper end of the oil filler tube 12 abuts to limit penetration of the oil filler tube into the cylindrical member 22.

The upper end portion of the cylindrical member 22 includes an overbored portion 28 which extends from a point spaced above the abutment shoulder 26 to a point spaced below the upper terminal end of the cylindrical member 22. A flexible sleeve 30 constructed of fibrous material is seated in the overbored portion 28 and it will be noted that the inner diameter of the sleeve 30 is substantially equal to the inner diameter of the upper end of the bore 24. Accordingly, it may be seen that the dip stick 16 may be inserted into the upper end of the cylindrical member 22 and passed downwardly therein with the lower end of the dip stick 16 engaged with the side walls of the dip stick wiper 14 without the lower end of the dip stick catching on any portion of the dip stick wiper which might resist its movement down into the oil filler tube 12.

The cylindrical member 22 includes an inwardly projecting annular portion 31 which defines, together with the abutment shoulder 26, a cylindrical recess 32 in which the upper end of the oil filler tube is snugly received. The inner surfaces of the inwardly projecting annular portion are generally truncated cone-shaped and the diameter of the major diameter end portion of the inwardly projecting annular portion 31 is substantially equal to the diameter of the adjacent portion of the bore 24. The minor diameter end portion of the inwardly projecting annular portion 31 has a diameter which is smaller than the inner diameter of the oil filler tube 12 and the minor diameter end portion terminates a spaced distance below the annular shoulder 26.

In operation, the dip stick 16 may be removed and the lower end of the dip stick wiper 14 may be telescoped over the upper end of the oil filler tube 12 as hereinbefore set forth in order to removably secure the dip stick wiper 14 to the oil filler tube 12. Then, the dip stick 16 may be replaced as though the abutment washer 20 thereof was to be abutted against the upper end of the oil filler tube 12.

If it is desired, either the dip stick 16 may be made longer by the addition of an extension to the lower end thereof or the abutment washer 20 may be positioned farther up the dip stick 16 to a point closer to the handle 18 in order to compensate for the additional effective length of the oil filter tube 12 caused by the securement of the dip stick wiper 14 thereto.

When it is desired to check the oil in the crankcase of the internal combustion engine 10, the opposite sides of the portion of the cylindrical member 22 which enclose the sleeve 30 may be pinched by the fingers of one hand until diametrically opposite portions of the sleeve 30 contact opposite sides of the dip stick 16. Then, the person's other hand may be utilized to withdraw the dip stick 16 which will cause the excess oil to be wiped from the lower end of the dip stick 16 by means of the inwardly deflected portions of the sleeve 30. Then, the dip stick 16 may be again inserted and subsequently withdrawn to check the oil level within the crankcase of the internal combustion engine 10.

Although the dip stick wiper of the instant invention has been illustrated and described herein as mounted upon the upper end of an oil filter tube of an internal combustion engine, it is to be noted that the dip stick wiper 14 may be readily secured to substantially all types of oil filler tubes.

The cylindrical member 22 is constructed of a material which is flexible but which is semi-rigid as hereinbefore set forth but it is to be further noted that the material from which the cylindrical member 22 is constructed also possesses phosphorescent properties thereby enabling the cylindrical member 22 to emit light even when in total darkness. Therefore, the location of the dip stick wiper 22 beneath the hood of a motor vehicle may be readily ascertained and thus the dip stick 16 may be readily removed and wiped, reinserted, removed for checking the oil level of the corresponding oil reservoir and then reinserted without groping for either the dip stick 16 or the dip stick wiper 22 in partial or total darkness.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an upstanding tube of the type communicated at its lower end with an oil reservoir and adapted to have a dip stick removably positioned therein and supported thereby, a dip stick wiper comprising a cylindrical member having one end portion adapted to be snugly telescoped over the upper end of said tube and including means defining an inwardly projecting annular abutment shoulder of a width at least equal to the thickness of the walls of said tube for abutting engagement with the upper terminal end of said tube limiting the penetration of the latter in the lower end portion of said cylindrical member, the upper end portion of said cylindrical member including a thin walled over-bored portion having its lower end spaced above said abutment shoulder and its upper end spaced below the upper terminal end of said cylindrical member, a flexible sleeve of fibrous material seated in said bored portion, and said cylindrical member being constructed of flexible but semi-rigid material.

2. The combination of claim 1 wherein said cylindrical member is constructed of a material having phosphorescent properties.

3. The combination of claim 1 wherein the thickness of the walls of said sleeve are at least equal to the extent of the overbore of said overbored portion of said cylindrical member.

4. The combination of claim 1 wherein said cylindrical member includes an inwardly projecting annular portion defining, together with said abutment shoulder, a cylindrical recess for snugly receiving the upper end of said tube.

5. The combination of claim 4 wherein the inner surfaces of said inwardly projecting annular portion are generally truncated cone-shaped with the diameter of the major diameter end portion being substantially equal to the diameter of the bore defined by and extending longitudinally through said cylindrical member.

6. The combination of claim 5 wherein the minor diameter end portion of said inwardly projecting annular portion is smaller than the inner diameter of said tube and said minor diameter end portion terminates a spaced distance below said annular shoulder.

7. The combination of claim 6 wherein said cylindrical member is constructed of a material having phosphorescent properties.

8. The combination of claim 7 wherein the thickness of the walls of said sleeve are at least equal to the extent of the overbore of said overbored portion of said cylindrical member.

References Cited in the file of this patent

UNITED STATES PATENTS

| 2,855,682 | Norgard | Oct. 14, 1858 |
| 3,041,730 | Feigin | July 3, 1962 |

FOREIGN PATENTS

| 520,210 | Canada | Jan. 3, 1956 |